US007778729B2

(12) United States Patent
Kobayashi et al.

(10) Patent No.: US 7,778,729 B2
(45) Date of Patent: Aug. 17, 2010

(54) ROBOT SYSTEM AND ROBOT CONTROLLER

(75) Inventors: Hirohiko Kobayashi, Yamanashi (JP); Yoshiharu Nagatsuka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 955 days.

(21) Appl. No.: 11/458,618

(22) Filed: Jul. 19, 2006

(65) Prior Publication Data

US 2007/0093939 A1    Apr. 26, 2007

(30) Foreign Application Priority Data

Jul. 20, 2005    (JP)    ............... 2005-209980

(51) Int. Cl.
*G06F 19/00*    (2006.01)
(52) U.S. Cl. ............. 700/245; 318/568.11; 318/568.12; 318/568.13; 318/568.14; 318/568.2
(58) Field of Classification Search ................. 700/245, 700/248; 318/568.11–568.2
See application file for complete search history.

(56) References Cited

U.S. PATENT DOCUMENTS

| 5,336,982 | A | * | 8/1994 | Backes ................. 318/568.22 |
| 2001/0035729 | A1 | | 11/2001 | Graiger |
| 2004/0153211 | A1 | * | 8/2004 | Kamoto et al. ............. 700/245 |
| 2005/0004707 | A1 | | 1/2005 | Kazi |
| 2006/0055358 | A1 | * | 3/2006 | Ogawa et al. .......... 318/568.24 |
| 2007/0067678 | A1 | * | 3/2007 | Hosek et al. ................. 714/25 |

FOREIGN PATENT DOCUMENTS

| JP | 2060338 A | 2/1990 |
| JP | 3280643 A | 12/1991 |
| JP | 5235975 A | 9/1993 |
| JP | 7123106 A | 5/1995 |
| JP | 2001350511 A | 12/2001 |
| JP | 2004-306200 A | 11/2004 |
| JP | 2004348315 A | 12/2004 |
| WO | 01/71878 A | 9/2001 |
| WO | 2005/063454 A | 7/2005 |

OTHER PUBLICATIONS

European Search Report issued Nov. 20, 2006 in corresponding Japanese Application.
Notice of Reasons for Rejection of Patent Application No. 2005-209980 mailed Jan. 22, 2008.
Notice of Reasons for Rejection dated Jul. 31, 2007 from JPO regarding Japanese Patent Application No. 2005-209980.

* cited by examiner

*Primary Examiner*—Khoi Tran
*Assistant Examiner*—Rodney King
(74) *Attorney, Agent, or Firm*—Lowe Hauptman Ham & Berner LLP

(57) ABSTRACT

A robot system capable of checking the status of all robot controllers connected to the same network by using at least one robot controller, among the robot controllers, having a function for checking the status. The robot system includes a plurality of robots and a plurality of robot controllers for controlling the robots. The robot controllers are connected to each other via a control network and also connected to an information network. The at least one robot controller, having the function of checking the status, transmits and receives data to and from the other robot controllers and, further, indicates information, concerning the statuses of the networks and the robots, on a display of a teaching operation panel of the at least one robot controller.

6 Claims, 6 Drawing Sheets

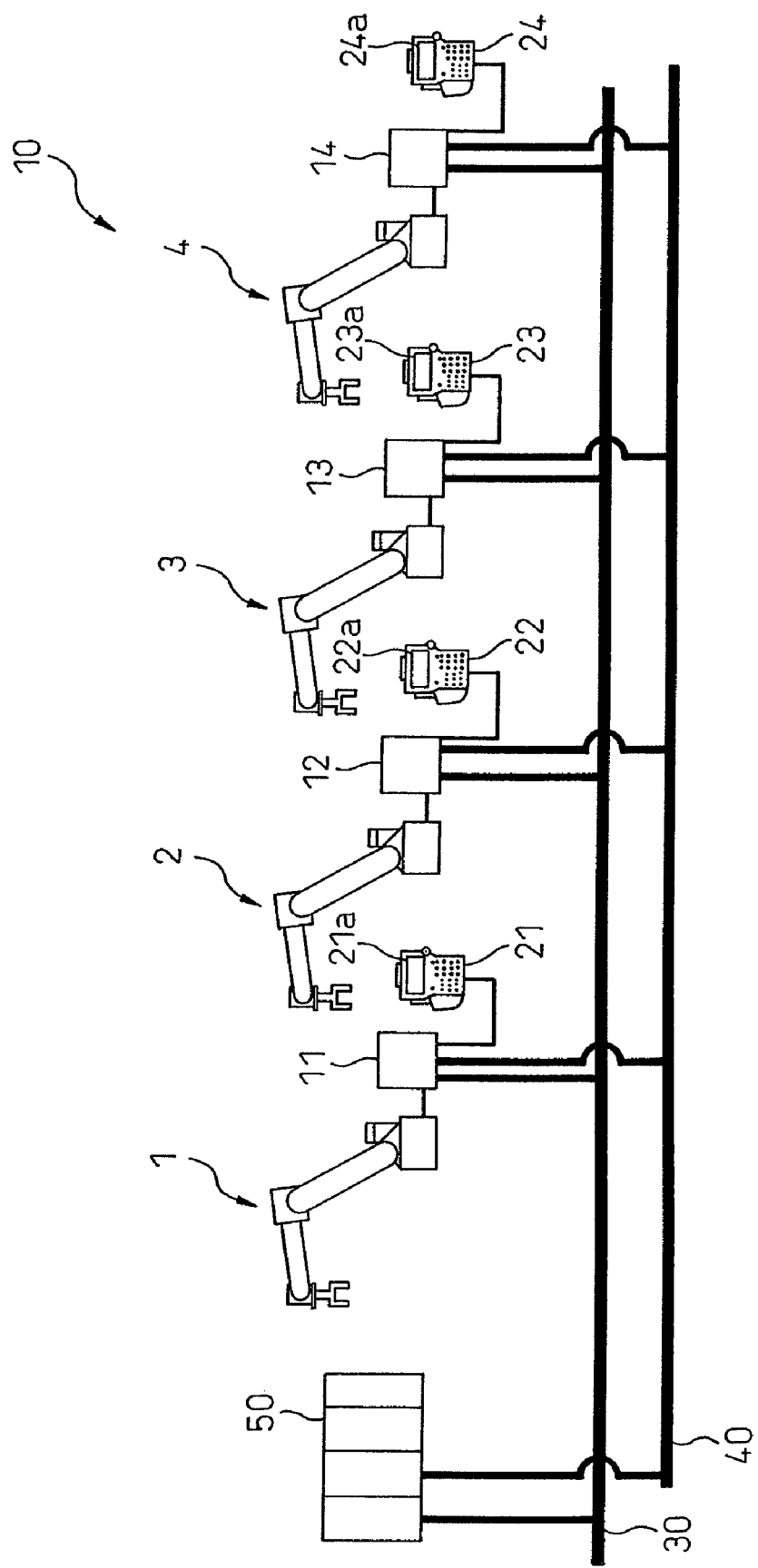

Fig.3

SETTING OF CONTROL NETWORK COMPOSITION

| CONNECTION ORDER | | IP ADDRESS | | | | DESCRIPTION OF DEVICE |
|---|---|---|---|---|---|---|
| 1 | OK | 192. | 168. | 0. | 100 | PLC MASTER |
| 2 | OK | 192. | 168. | 0. | 10 | ROBOT 1 RIGHT FRONT OF CARBODY |
| 3 | OK | 192. | 168. | 0. | 20 | ROBOT 2 LEFT FRONT OF CARBODY |
| 4 | OK | 192. | 168. | 0. | 30 | ROBOT 3 RIGHT REAR OF CARBODY |
| 5 | NG | 192. | 168. | 0. | 40 | ROBOT 4 LEFT REAR OF CARBODY |

[ CONNECTION CONFIRMATION ]

LIST OF CONTROL NETWORK CHECK (yyyy/mm/dd  hh:mm:ss)

| CONNECTION ORDER | ADDRESS | DESCRIPTION OF DEVICE | STATUS |
|---|---|---|---|
| 1 | 1 | PLC MASTER | PARTIALLY ABNORMAL |
| 2 | 10 | ROBOT 1  RIGHT FRONT OF CARBODY | NORMAL |
| 3 | 20 | ROBOT 2  LEFT FRONT OF CARBODY | NORMAL |
| 4 | 5 | ROBOT 3  RIGHT REAR OF CARBODY | ABNORMAL |
| 5 | 3 | ROBOT 4  LEFT REAR OF CARBODY | NO RESPONSE |

[STOP UPDATE]  [DETAIL]  [ACCESS TO INFORMATION]  [STORE]

| SETTING OF DETAIL OF CONTROL NETWORK CHECK (MASTER) | | | |
|---|---|---|---|
| CONNECTION ORDER | ADDRESS | DESCRIPTION OF DEVICE | STATUS |
| 2 | 10 | ROBOT 1 RIGHT FRONT OF CARBODY | NORMAL |
| 3 | 20 | ROBOT 2 LEFT FRONT OF CARBODY | NORMAL |
| 4 | 5 | ROBOT 3 RIGHT REAR OF CARBODY | TIME OUT ERROR |
| 5 | 3 | ROBOT 4 LEFT REAR OF CARBODY | TIME OUT ERROR |

BACK

CHECK RESULT OF CONTROL NETWORK STATUS

CHECK CABLE BETWEEN ROBOT 2 AND ROBOT 3.
CHECK POWER SOURCE OF ROBOT 4 AND INFORMATION NETWORK.

OK

ROBOT SYSTEM AND ROBOT CONTROLLER

RELATED APPLICATIONS

The present application is based on, and claims priority from, Japanese Application Number 2005-209980, filed Jul. 20, 2005, the disclosure of which is hereby incorporated by reference herein in its entirety.

BACKGROUND OF THE INVENTION

1. Field of the Invention

The present invention relates to a robot system, including both of an information network and a control network, and to a robot controller included in the robot system.

2. Description of the Related Art

In a robot system using a plurality of robots, robot controllers for controlling the robots are connected to each other via communication lines. For example, Japanese Unexamined Patent Publication No. 2004-306200 discloses a robot control system including one or more robot controllers, an administrative server connected to the robot controller via a robot communication line and an external computer connected to the server via an external communication line.

In a conventional robot system, it is necessary to check the statuses of all the robot controllers connected to a control network, one-by-one, in order to monitor and check the status of the whole network of the system. Accordingly, when a fault occurs in the network, it is necessary to check for a fault in each robot by operating a teaching device so as to find the source of the fault. However, such an operation takes a long time and imposes a burden on an operator.

SUMMARY OF THE INVENTION

Accordingly, an object of the present invention is to provide a robot system in which an operator may check the statuses of all robot controllers in one network, by using at least one robot controller, and a robot controller having a function of checking the statuses in the robot system.

To this end, according to the present invention, there is provided a robot system including a plurality of robots, a plurality of robot controllers for controlling the robots and a control network connected to the robot controllers for transmitting and receiving data used for controlling the robots, the robot system further comprising an information network connected to the robot controllers for transmitting and receiving information between the robot controllers, wherein at least one robot controller of the plurality of robot controllers has the function for checking the status of the control network, the at least one robot controller further comprising: a communication means for sending a query concerning the status of the control network to each robot controllers via the information network, and for receiving a response from each robot controller, the response including information concerning the status of the control network as viewed from each robot controller; a check means for checking the status of the control network as viewed from the at least one robot controller; and a display means for indicating the information from each robot controller and a check result from the check means.

The robot system may further comprise a master of the control network connected to both of the control network and the information network. In this case, the communication means also sends a query concerning the status of the control network to the master via the information network, and receives a response from the master, the response including the information concerning the status of the control network as viewed from the master. Further, the display means also indicates the information from the master.

The at least one robot controller may send the query concerning the status of the control network to each robot controller when a time interval of the transmission from the master to the at least one robot controller is longer than a predetermined interval.

The at least one robot controller may send the query concerning the status of the control network to each robot controllers when a number of times, when the information received by the at least one robot controller is damaged, exceeds a predetermined upper limit.

It is preferable that the at least one robot controller further comprises: a memory means for storing a connection order of the plurality of robot controller in the control network and associated with network addresses of the robot controllers; and a notice means, for identifying a segment having an occurred fault in the control network by using the data received from the other robot controllers and the connection order stored in the memory means and for informing an operator of the location of the segment in the control network such that the operator may remove the cause of the fault.

According to another aspect of the invention, there is provided a robot controller, having the function for checking the status, used in the above robot system.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 1a shows a schematic configuration of a robot system according to the present invention;

FIG. 1b shows a detailed constitution of a robot controller as shown in FIG. 1a;

FIG. 3 shows an example of a setting display of the composition of a control network;

FIG. 4 shows an example of a display of a list indicating the status of the control network;

FIG. 5 shows an example of a display indicating a detail of the display of FIG. 4; and FIG. 6 shows an example of a display indicating a totally inspected result of the control network.

DETAILED DESCRIPTION

Figure 1B:
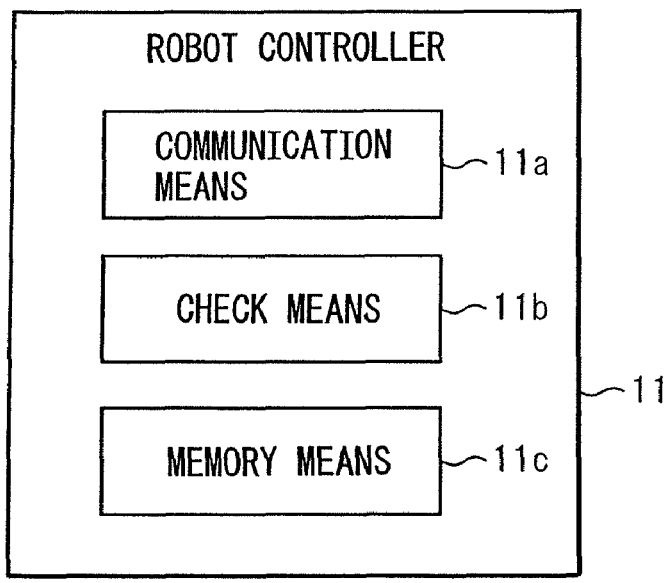

Hereinafter, the present invention is described with reference to the drawings. FIG. 1a shows a schematic configuration of a robot system 10 according to the invention. The robot system 10 includes a plurality of (four in this embodiment) robots 1, 2, 3 and 4, a plurality of robot controllers 11, 12, 13 and 14 for controlling the robots. Each robot controller has a teaching operation panel 21, 22, 23 or 24 connected thereto. Each teaching operation panel has a display 21a, 22a, 23a or 24a as an operation screen for each robot. As described below, a display, of a teaching operation panel of a robot controller having a function for checking the status of a control network, may also display the statuses of the other robots.

The robot controllers 11, 12, 13 and 14 are connected to each other by means of a control network 30 and, further, by means of an information network 40. Preferably, the robot system 10 further includes a master or a PLC (programable logic controller) 50, for wholly controlling the system 10, connected to both of the control and information networks.

The control network 30 is used for transmitting I/O data and/or a signal to each robot controller to control each robot. On the other hand, the information network 40 is used for exchanging information between the robot controllers, as described below. Therefore, at least one robot controller is capable of obtaining information concerning the control network 30 as viewed from the other robot controllers. Also, the at least one robot controller has a display for displaying the obtained information on the display of the teaching operation panel thereof.

Next, the statuses of each robot and the network, which may be displayed by using the above configuration, are explained. In the embodiment, it is assumed that the robot controller 11 of the robot 1 has a function of checking the status of the control network 30. As shown in FIG. 1b, the controller 11 has a communication means 11a for sending a query concerning the status of the control network 30 to each robot controllers via the information network 40, and for receiving a response from each robot controller, the response including the information concerning the status of the control network 30 as viewed from each robot controller, a check means 11b for checking the status of the control network 30 as viewed from the robot controller 11, and a display means or a display 21c for indicating the information from each robot controller and a check result by the check means 11b.

The robot controller 11 may further have a memory 11c for storing a connection order of the plurality of robot controllers 11 to 14 in the control network 30 and associated with network addresses of the robot controllers. Accordingly, the robot controller 11 may identify a segment having an occurred fault in the control network 30 by using the data received from the other robot controllers and the connection order stored in the memory 11c via the information network 40 and may inform an operator of the location of the segment in the control network 30 such that the operator may remove the cause of the fault.

As described below with reference to FIGS. 2 to 6, the robot controller 11 transmits or receives data to or from the other robot controllers 11 to 14 by means of the information network 40. Further, the robot controller 11 can indicate various information, concerning the control and information networks and the status of each robot, on the display 21a of the teaching operation panel 21.

Figure 2:
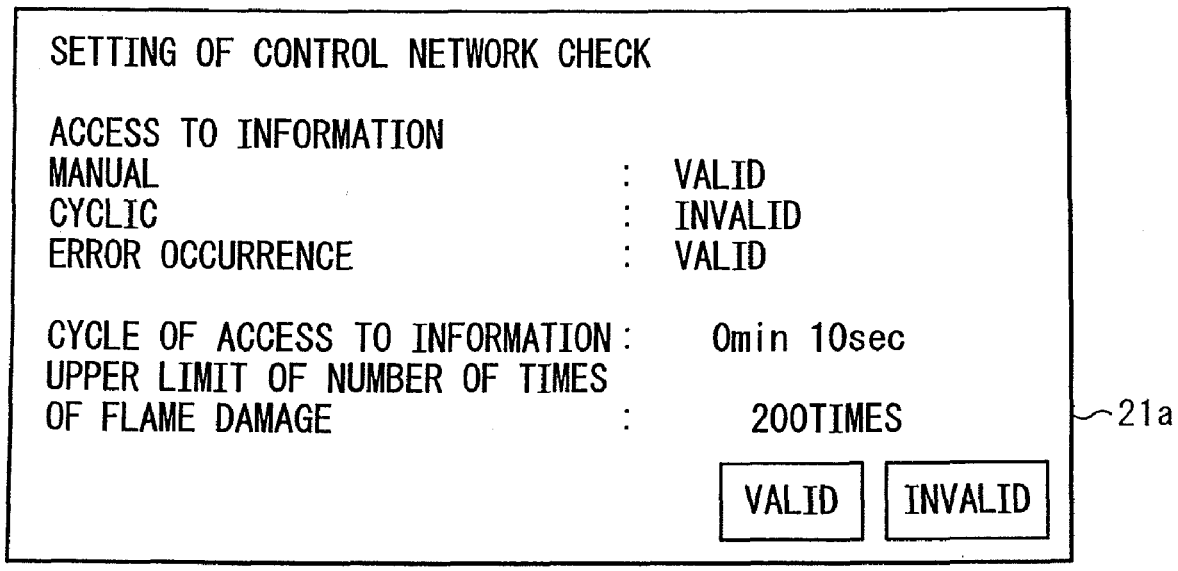
FIG. 2 shows a display of a teaching operation panel of the robot controller.

FIG. 2 shows an example of the display 21a of the operation panel 21 of the robot controller 11, which indicates a diagnostic setting screen of the control network 30. As shown in FIG. 2, on this screen, each option concerning access to information of the control network 30 is enabled or disabled. Possible examples of the option include "manual" in which the operator may obtain information by pushing an information access key on the screen, "cyclic" in which the access to information is automatically performed in a predetermined cycle, and "error occurrence" in which the access to information is automatically performed when an error occurs in the control network 30 or the number of times when data damage (or frame damage) exceeds a predetermined upper limit. Further, on the setting screen, the cycle of access to information may be inputted when the option "cyclic" is valid, and the upper limit of the number of the frame damage may be inputted when the option "error occurrence" is valid.

Next, FIG. 3 shows an example of a setting screen of the composition of a control network 30. On this screen, IP addresses of the robots 1 to 4 and the master 50 and a connection order thereof in the information network 40 are arbitrarily set. When a connection check key on the screen is pushed, the status of the information network 40 is checked. Concretely, as shown in FIG. 3, a sign such as "OK" is applied to the master or the robot which is effectively connected to the information network. Otherwise, another sign such as "NG" is applied to the master or the robot which gives no response. Also, a concise description or a comment such as "PLC, Master" or "Robot 1, Right Front of Carbody" concerning the master or the robot may be inputted in a column "equipment descriptions" on the screen. The inputted comment in the column is used in status indicating screens of the control network 30 as described below.

FIGS. 4 to 6 show screens each indicating the status of the control network 30. First, FIG. 4 shows an example of a screen of a list indicating the status of the control network 30. Based on information received from the robot controllers 12 to 14 and the PLC 50 via the information network 40 in response to the query sent by the controller 11, this screen displays a connection order of the PLC and each robot in the control network 30, network addresses of the PLC and each robot in the control network 30, the descriptions or the comments inputted on the screen of FIG. 3, and statuses of the PLC and each robot. At this point, each of the statuses means, for example, the presence or the absence of an error in the control network as viewed from the PLC or each robot controller. Obviously, the robot controller 11 also checks the status of the control network as viewed from the controller 11. Possible displayed examples of the status of the control network 30, based on the check result of the controller 11 and the responses from the PLC 50 and the controllers 12 to 14, include "normal" in which the communication is normally performed, "abnormal" in which an error occurs in the control network 30, and "no response" in which the controller 11 receives no response from corresponding controller or the PLC because of an error in the information network 40, as indicated in a column concerning the robot 4 in FIG. 3. In addition, the status "partially abnormal" as indicated in a column concerning the master is described below.

As shown in a bottom row on the screen of FIG. 4, various operation keys may be arranged. For example, when a key "information access" is pushed, the status of the control network at the present moment is checked and updated. If the option "cyclic" of FIG. 2 is valid, the cyclic access to information may be interrupted by pushing a key "stop update". Then, indication of the key is changed from "stop update" to "restart update" (not shown), therefore, the cyclic access may be restarted by pushing the key. Further, when a key "store" is pushed, the indicated content at the present moment is stored in a suitable memory with corresponding time data.

In the master or the PLC 50, in relation to the control network 30, there may be a situation in which the communication with one slave or robot is normal but, simultaneously, the communication with another robot has an error. In such a case, the above status "partially abnormal" is displayed. The detail of the status may be indicated by, for example, pushing a key "detail" in the bottom row after pointing a cursor to "PLC" on the screen. FIG. 5 shows an example of the detail of the status. By means of the list of FIG. 4 and the detail of FIG. 5, it can be found where an error is in the control network. For example, in the example of FIGS. 4 and 5, the statuses of the robot 1 and 2 near the PLC 50 are normal and the statuses of the robot 3 and 4 far from the PLC are abnormal. Therefore, it is considered that an error occurs in a control network cable between the robots 2 and 3. Further, as the status of the robot 4 indicates "no response", it is considered that the robot 4 is powered off or another error has also occurred in the information network around the robot 4.

Finally, as shown in FIG. 6, the above mentioned checked result may be sent to the operator by using a notice means such as a pop-up window. If an error occurs, a message or a demand for removing the error, for example exchanging a cable for another cable, may be displayed on the pop-up window. Therefore, the operator can identify where the error has occurred in the network without checking the master and the robots one-by-one, whereby time and labor required for restoration of the system may be greatly reduced.

According to the robot system of the invention, the status of the control network as viewed from each robot may be checked and indicated by using the information network. Therefore, the operator can easily check the presence or the absence of an error and find where the error occurs, whereby the workload on the operator, in case of trouble, may be significantly reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot system, comprising:
   a plurality of robots,
   a plurality of robot controllers for controlling the robots,
   a control network connected to the robot controllers for transmitting and receiving data used for controlling the robots,
   a separate parallel information network connected to the robot controllers for transmitting and receiving information between the robot controllers,
   wherein at least one robot controller among the plurality of robot controllers has the function for checking a status of the control network, the at least one robot controller further comprising:
   communication means for sending a query concerning the status of the control network to each robot controller via the information network, and for receiving a response from each robot controller, the response including the information concerning the status of the control network as viewed from the robot controller that sends the response;
   check means in the information network for checking the status of the control network as viewed from the at least one robot controller; and
   display means for indicating (i) the information in the response received from each robot controller and (ii) a check result by the check means.

2. The robot system as set forth in claim 1, further comprising:
   a master of the control network, said master being connected to both of the control network and the information network,
   wherein the communication means also sends a query concerning the status of the control network to the master via the information network, and receives a response from the master, the response including the information concerning the status of the control network as viewed from the master, and
   wherein the display means also indicates the information in the response received from the master.

3. The robot system as set forth in claim 1, wherein the at least one robot controller sends the query concerning the status of the control network to each robot controller when a time interval of a transmission from the master to the at least one robot controller is longer than a predetermined interval.

4. The robot system as set forth in claim 1, wherein the at least one robot controller sends the query concerning the status of the control network to each robot controller when the number of times the information received by the at least one robot controller is damaged exceeds a predetermined upper limit.

5. The robot system as set forth in claim 1, wherein the at least one robot controller further comprises:
   memory means for storing (a) a connection order in which the plurality of robot controllers are connected in the control network and, in association with the connection order, (b) network addresses of the robot controllers; and
   notice means for identifying a segment having an occurred fault in the control network by using (i) the connection order stored in the memory means and (ii) data received from the other robot controllers via the information network, and for informing an operator of the location of the segment in the control network to enable the operator to remove the cause of the fault.

6. A robot controller, having a function for checking the status, used in the robot system as set forth in claim 1.

* * * * *